June 2, 1964      C. F. MICKEY ETAL      3,135,544
COMPARTMENTED TRUCK BODY WITH ROLL-UP DOORS
Filed Oct. 20, 1961      4 Sheets-Sheet 1
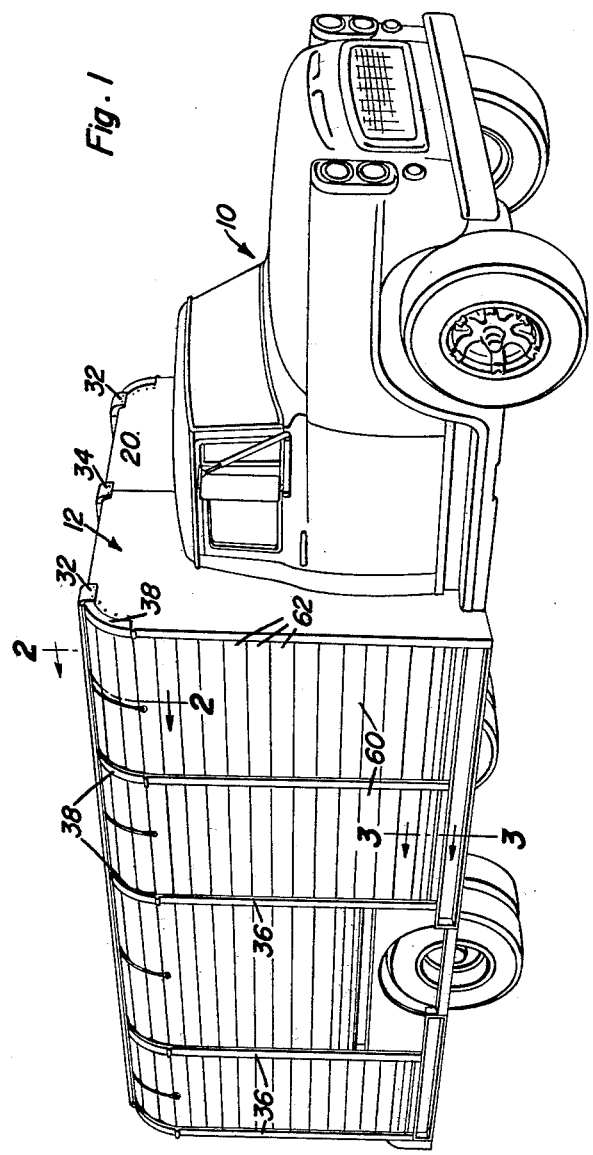
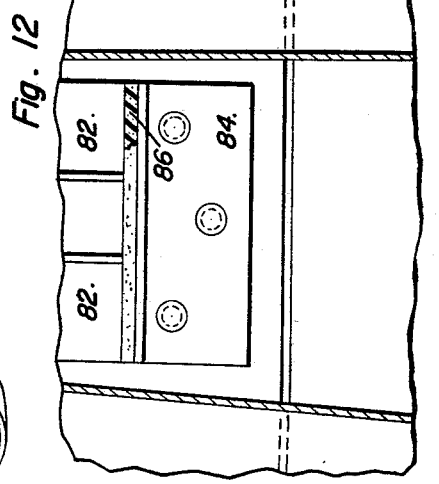
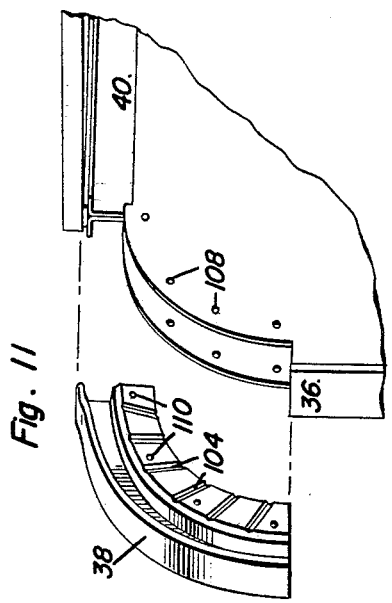
Carl F. Mickey
Lawrence E. Mickey
INVENTORS

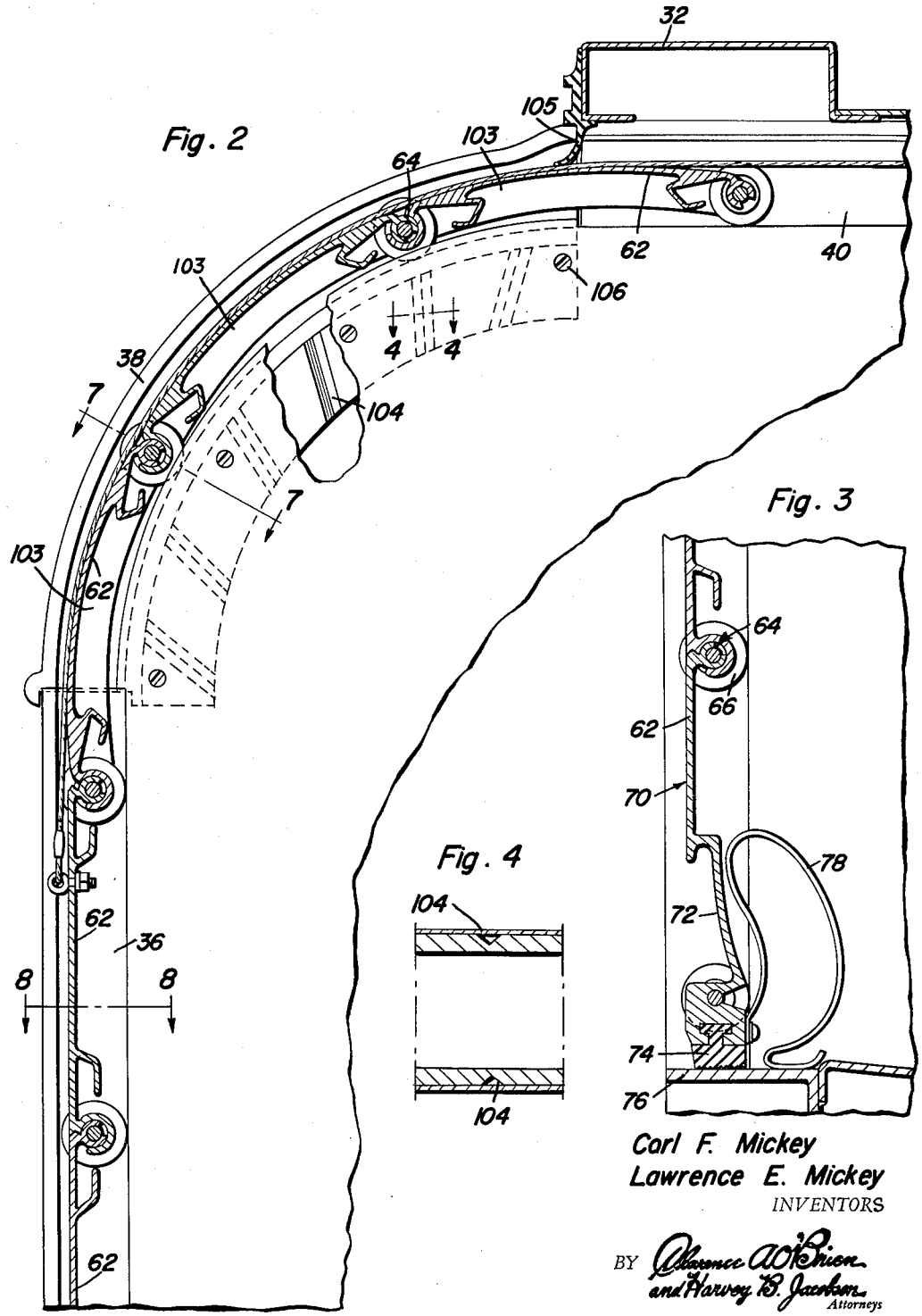

June 2, 1964   C. F. MICKEY ETAL   3,135,544
COMPARTMENTED TRUCK BODY WITH ROLL-UP DOORS
Filed Oct. 20, 1961   4 Sheets-Sheet 3

Carl F. Mickey
Lawrence E. Mickey
INVENTORS.

BY *Lawrence A. O'Brien*
*and Harvey B. Jackson*
Attorneys

Carl F. Mickey
Lawrence E. Mickey
INVENTORS

United States Patent Office 3,135,544
Patented June 2, 1964

3,135,544
COMPARTMENTED TRUCK BODY WITH ROLL-UP DOORS
Carl F. Mickey and Lawrence E. Mickey, both of P.O. Box 1925, High Point, N.C.
Filed Oct. 20, 1961, Ser. No. 146,460
15 Claims. (Cl. 296—24)

This invention comprises a novel and useful compartmented truck body with roll-up doors and more particularly pertains to a vehicle body construction having a pair of compartments disposed in back-to-back relation transversely of the vehicle body with a chamber between the compartments for reception of the sliding closure doors of the compartments.

A further object of the invention is to provide a vehicle body construction in accordance with the foregoing object having an exceptionally compact sliding door arrangement whereby the sliding doors may be stored partially above the compartment and partially in the chamber between compartments in order to thereby reduce to a minimum the requisite overhead room imposed on the compartments by the sliding doors in a vehicle body construction.

A further object of the invention is to provide a vehicle body construction in accordance with the preceding objects which will substantially reduce the over-all height of a vehicle by eliminating the space heretofore necessary for the sliding movement of one sliding door of one compartment above the sliding door of the other compartment during the opening of the doors.

An additional important object of the invention is to provide a vehicle body construction in accordance with the preceding objects wherein the sliding doors of the transversely aligned compartments may be conveniently and compactly stored at least partially within the chamber disposed between the adjacent backs of adjacent compartments.

Yet another object of the invention is to provide a vehicle body construction in which the sliding doors thereof are provided with an improved door actuating cable system such that the cables will not rub or chafe upon the faces of the doors during their sliding movement.

A further and important object of the invention is to provide a device in accordance with the above mentioned objects wherein the cable system controlling sliding movement of the doors is such as to dispense with the use of customary door cable guides commonly employed for vehicle sliding doors.

A still further important object of the invention is to provide in a device of the character above set forth a door actuating cable system which will automatically compensate for a portion of the unbalanced weight of a door as the latter varies during its sliding movement between its closed and open positions whereby there is maintained a constant unbalanced weight on the door in all positions of its travel.

Yet another purpose of the invention is to provide a vehicle body construction in which the sliding door track means shall be provided with a removable or replaceable section thereby enabling ready insertion of the door supporting rollers and the door assembly into and out of the sliding door track means.

Still another important purpose of this invention is to provide a vehicle body construction of the type having vertically sliding doors on one or both sides of the body and in which the height or width of the body does not impose a limit on the height of the sliding door, which latter may equal or exceed the vertical height of the body in contrast with conventional construction in which the doors are stored straight across the width of the body parallel to the roof and thus are limited in their vertical height to the width of the body as the roof.

And a final important object of the invention to be specifically enumerated herein resides in the provision of a vehicle body construction in accordance with the foregoing objects wherein there is provided an effective weather seal and water drain means for the doors, the roof or top of the vehicle and the track means of the device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view showing the manner in which the principle of this invention is applied to the truck body of an automotive vehicle;

FIGURE 2 is a fragmentary detail view taken in vertical transverse section upon an enlarged scale substantially upon the plane indicated by the section line 2—2 of FIGURE 1, certain concealed parts being shown in dotted lines and parts being broken away and showing in particular a portion of the track means and of a sliding door of one of the compartments of the body construction in the closed position of the door;

FIGURE 3 is a further detail view taken upon an enlarged scale in vertical transverse section substantially upon the plane indicated by the section line 3—3 of FIGURE 1 and showing the lower end of a sliding door in the closed position of the latter;

FIGURE 4 is a further detail view in horizontal section taken substantially upon the plane indicated by the section line 4—4 of FIGURE 2;

FIGURE 11 is a detail view in exploded perspective and illustrating the removable track section and its association with the track means of the device; and FIGURE 12 is a further detail view of a feature of the invention.

Figure 5:
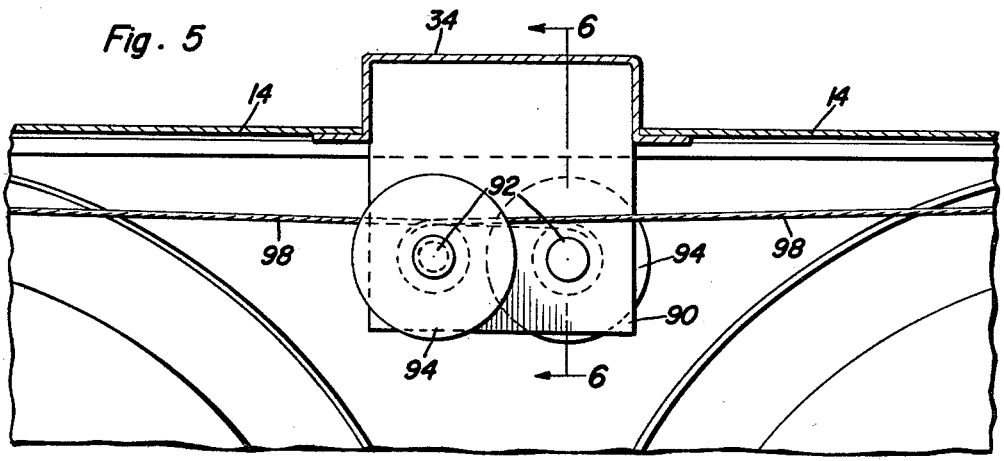
FIGURE 5 is a detail view in vertical transverse section showing especially the central portion of the vehicle body with downwardly curving portions of the track sections of two transversely aligned compartments and the disposition of the cable and winch construction therein.

It is becoming increasingly desirable in certain types of vehicles such as trucks and particularly in those types of vehicle bodies adapted to handle cases of soft drinks and the like to provide pairs of transversely aligned compartments within the body, each compartment having an independently operable sliding door whereby access may be had to the compartments individually. However, where sliding doors have been heretofore provided upon opposite sides of a vehicle whether controlling the opposite sides of a single compartment or for control of transversely aligned compartments, it has been heretofore the common practice to so mount these sliding doors that one may pass vertically above the other when the doors are in their open position, thereby increasing the height of the vehicle or conversely, decreasing the height of the sliding doors by the limitations opposed by the two vertically spaced horizontally positioned doors in their raised positions and by the limitation imposed by the width of the body at the roof.

Further, where vertically traveling sliding doors have been provided for various compartments, it has been customary to employ a cable actuating or support means for the doors with or without various counterbalancing means in order to control the raising and lowering of the doors. However, it is evident that when doors are raised from a vertical lowered and closed position up through a horizontal position, the effective weight of the door varies as different portions of its length are supported in a horizontal trackway above the compartment being controlled by the door. The counterbalancing of the door is therefore quite difficult and usually necessitates a rather cumbersome, expensive and bulky mechanism for this purpose.

Still further, in vertically sliding doors for various enclosures and in which the doors are mounted for sliding movement in supporting trackways, it has been heretofore difficult to obtain proper access to the trackways to admit an individual door to be inserted or removed therefrom. Frequently, it is necessary to dismantle substantially an entire construction in order to obtain access to a particular doorway mounting means and remove the same from its track structure.

It is therefore the fundamental purpose of this invention to overcome all of the above mentioned difficulties by providing an improved truck body compartmental structure which shall be extremely simple and inexpensive in its construction yet very compact and one capable of easy servicing.

In the accompanying drawings referring first to FIGURE 1 it will be observed that the numeral 10 designates generally a vehicle such as a truck having a truck body 12 thereon. This truck body has the usual top 14, sides 16 and a bottom including frame members 18, see FIGURE 10, together with end walls 20. In accordance with this invention the interior of the vehicle body is divided by suitable longitudinally spaced bulkheads or partitions, not shown, into pairs of adjacent compartments 22 and 24, see FIGURE 10, which are aligned transversely of the vehicle body. As will be observed in this figure each compartment includes a suitable floor 26 together with a back wall 28 whose upper end terminates short of the vehicle body to or roof 14 for a purpose to be subsequently apparent. The two back walls 28 are spaced from each other to thus provide a chamber 30 therebetween.

Conveniently, the vehicle body top 14 may be formed by applying relatively thin and inexpensive sheet metal panels to a series of longitudinally extending channel members 32 which include a medially longitudinally disposed channel member 34 overlying the chamber 30.

The sides of the vehicle body include a plurality of vertically extending channel members 36 which as shown in FIGURE 2 are connected by a curved or arcuate removable channel section 38 with horizontally extending channel sections 40 disposed directly beneath the top or roof 14. The three channel portions 36, 38 and 40 comprise the track means for each of the compartments 22 or 24.

Figure 7:
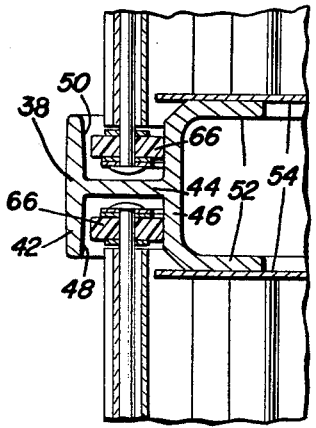
FIGURE 7 is a detail view taken in horizontal section substantially upon the plane indicated by the section line 7—7 of FIGURE 2 and showing certain details of the track means of the construction.
Figure 8:
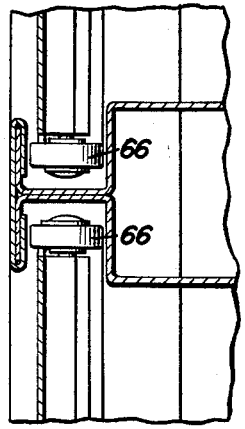
FIGURE 8 is a further detail view taken in horizontal section substantially upon the plane indicated by the section line 8—8 of FIGURE 2 and showing further details of the track means of the device.

As will be readily appreciated, as shown more clearly in FIGURE 7, the channel members 36 and of course their corresponding related channel members 38 and 40 which are intermediate or between adjacent compartments are of H-shaped configuration, consisting of an outer flange 42 which is joined by a single web 44 to an inner flange 46 thus providing a pair of trackways as 48 and 50 into which the adjacent ends of a pair of adjacent sliding doors of adjacent compartments are received. The inner flange 46 is preferably provided with angulated flanges 52 to which are secured a partition or panel construction 54 which divides the compartments 22 and 24 from the next longitudinally positioned pair of transverse compartments in the vehicle body. However, as will be readily appreciated, the foremost and rearmost of the channels 36 and their corresponding sections 38 and 40 do not require the double channel construction but are U-shaped to receive merely the one end of their corresponding sliding door.

Figure 9:
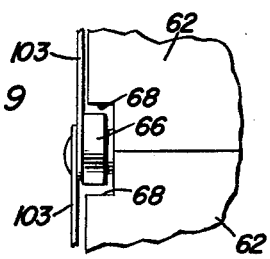
FIGURE 9 is another detail view showing the articulated panel construction of a sliding door and a weather baffle used therewith.

Slidably mounted in the track means previously described is a sliding door 60 for each of the compartments 22 or 24. Since the sliding doors are all identical, a description of one will suffice for an understanding of the principles of this invention. Each sliding door consists of a series of preferably flat sections or panels 62 having their adjacent horizontal edges pivotally connected to each other by a pivotal connection indicated generally by the numeral 64 in FIGURES 2 and 3. Inasmuch as the details of this pivotal connection form no part of the invention claimed herein, and since numerous pivotal ararngements could be provided for this purpose, a further description of the same is deemed to be unnecessary. It is however an important feature of the invention that each of these pivotal connections includes a supporting roller 66 which is receivable in the corresponding tracks 48 or 50 of the track means and as shown in FIGURE 9, the adjacent edges of the panel sections 62 are cutaway or notched as at 68 to provide clearance for the support rollers thereby allowing the panel to extend into the track means.

The panel sections of each door are of a resilient nature so that the same will readily flex as the door moves through the curved track section 38 as shown in FIGURE 2. The panel sections are identical except that the lowermost section of the panel indicated generally by the numeral 70, see FIGURE 3, is preferably provided with a recess 72 in it to provide a hand grip and is also provided at the lower end thereof with a resilient or cushioning element 74 to cushion the engagement of the lower end of the sliding door with the element 76 on the bottom of the truck body and establish a weathertight seal therewith. Further, a strap or other means 78 is secured to the section to provide a hand grip to facilitate pulling the door downwardly from its raised position.

Figure 10:
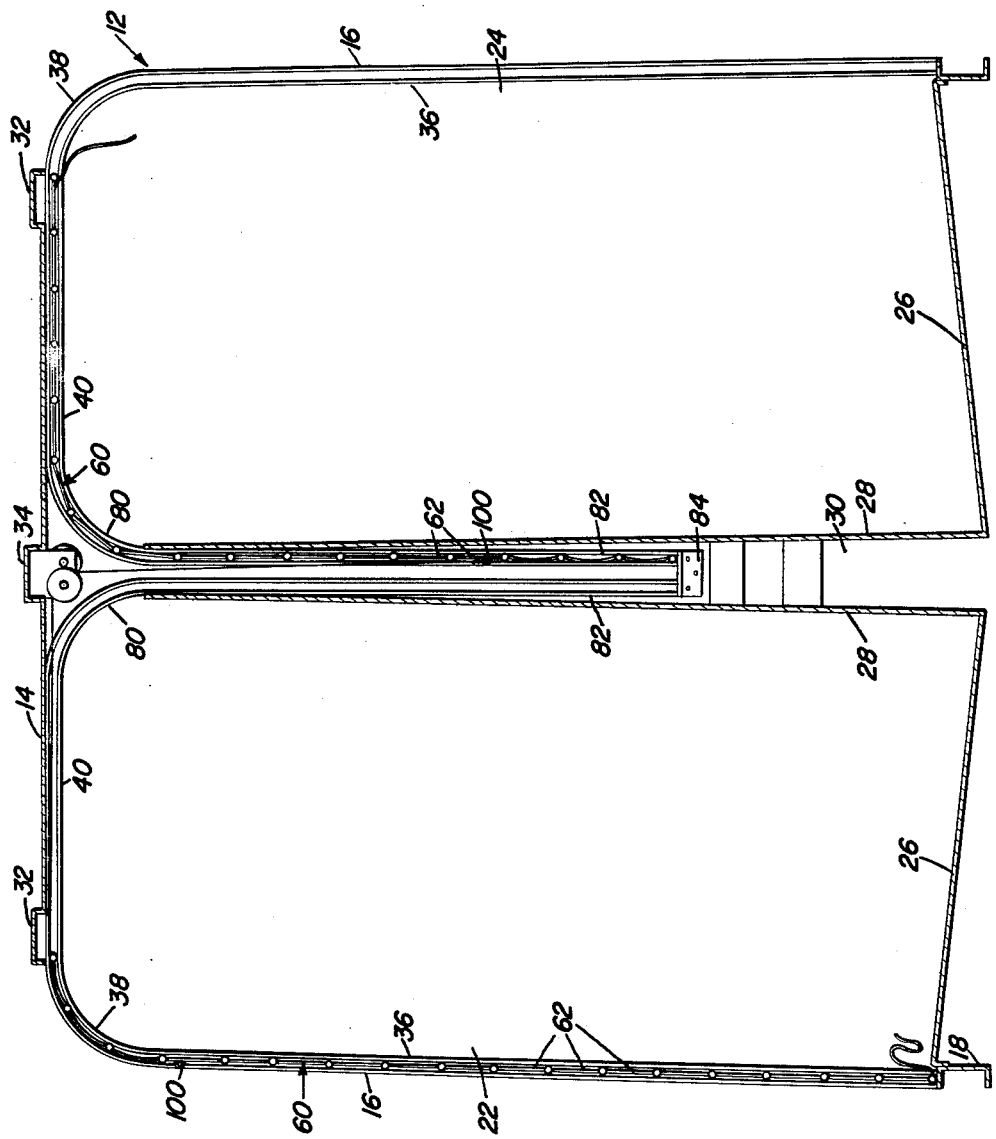
FIGURE 10 is a vertical transverse sectional view through the truck body and showing the disposition of a pair of transversely aligned and spaced compartments and with a door-storing chamber therebetween in accordance with this invention.

As will be better observed from FIGURE 10, the horizontal track sections 40 at their inward ends include downwardly curving portions 80 which at their lower ends terminate in dependent vertical positions 82.

As so far described it will now be apparent that when the doors are properly mounted in their track means, they may be slidably moved between the closed position of the door 60 of the compartment 22 of FIGURE 10 to the open position as shown by the door 60 of the compartment 24 of FIGURE 10. The track portions 82 are disposed in the chamber 30 between the two compartments so that what may be termed the rearward ends of the doors are recessed in side-by-side relation in the chamber when the doors are both opened. Consequently, since provision must be made only to receive one door track between the roof 14 of the track body and the chamber of a compartment 22 or 24, the over-all height of the vehicle is thereby reduced, the chamber 30 providing the necessary space for receiving and storing the doors in their open positions.

As shown in the detaill view of FIGURE 12 in conjunction with FIGURE 10, the lower ends of the track portions 82 are closed by a transverse member 84 upon which rests a resilient cushioning member 86 providing a resilient stop to receive the adjacent edges of the doors when the latter are in their fully open position.

Figure 6:
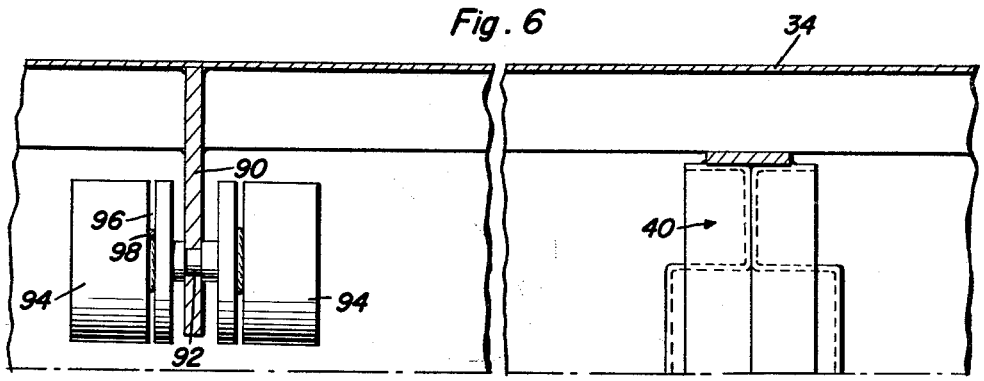
FIGURE 6 is a fragmentary view in vertical longitudinal section taken substantially on the plane indicated on the section line 6—6 of FIGURE 5 and showing further details of the cable and winch assembly.

In order to effectively control the actuation of the doors and to counterbalance the same each door is provided with a cable actuating system. As shown in FIGURES 5 and 6, there are received within and depend from each of the medial roof channel members 34 support brackets in the form of plates 90 upon the opposite sides of which are mounted as by an axle 92 a spring biased winch drum 94. Each such drum is provided with a groove 96 of sufficient width to receive therein a cable 98, there being provided one such cable for each of the sliding doors. One of the pair of winch drums 94 has its cable 98 secured to the sliding door of the compartment 22, while the other one has its cable secured to the sliding door of the compartment 24. Disposed within each of the winch drums is a spring, not shown, of any conventional design such that by properly adjusting the spring any desired rewinding force may be applied to the cables and thus exert a lifting force upon the attached door.

An important feature of this invention is the providing of the grooves 96 of a width such that the cable wound therein must have its convolutions wound one upon the other. Thus each time the drum rotates, the diameter of the cable wound thereon will vary. Therefore, when the cable is unwound from the drum to its maximum extent as when the door is in its lowered or closed position, the maximum spring tension is exerted by the spring winch upon the cable while the shortest effective radius arm of the winch from the cable is provided. This insures the maximum lifting force upon the door, which opposes or counteracts to a desired extent the full weight of the door. As the door is lifted, the unbalanced weight of the door, that is, that portion of the door which lies in the vertical tracks becomes less as an increasing portion of the door is carried by the horizontal track 40. However, to compensate for this reduction in the unbalanced weight of the door, there is a corresponding decrease in the tension of the spring means in the winch 94 and also an increase in the lever arm resulting from the cable being wound upon the drum in the groove 96, and these two factors may be so adjusted as to insure that the unbalanced weight of the door remains substantially constant throughout its entire extent of travel. Thus, a very simple arrangement is provided which will greatly reduce the physical effort required to raise or lower a door, stabilizing this effort at a substantially constant value.

A further important feature of this invention is that the cable 98 which is attached to each door is not secured to the extreme edge of the latter but instead is attached to the door at a position indicated by the numeral 100 in FIGURE 10 which is spaced from both ends of the door. Moreover, by disposition of the axes of the drums 94 directly above the chamber 30, and by the disposition of these axes above the horizontal line of travel of the door when riding in the horizontal portions 40, a scraping or chafing of the cables upon the surfaces of the doors during their travel is substantially eliminated. This will be readily apparent from a comparison of the position of the doors for the compartments 22 and 24 as shown in FIGURE 10. In the compartment 22, the cable lies above the top surface of the door, resting only upon the extreme end of the door when the latter is in its closed position. As shown at the right side of FIGURE 10 for the compartment 24, the cable depends vertically out of contact with the face of the door when the latter is in its fully open position, the cable extending into the chamber 30.

It will thus be apparent that there is provided a very compact and effective cable system which will minimize chafing or wearing of the cable and doors and also will effectively counterbalance the doors to maintain a substantially constant balanced weight therefor.

The inner curved ends of the horizontal track sections as shown in FIGURES 5 and 10 provide space for the counterweight drums without increasing the over-all height or interfering with the travel or storage of the sliding dors.

As previously mentioned, each of the trackways is provided with a removable track section 38. Referring now to FIGURE 11 in conjunction with FIGURES 7 and 2 it will be seen that the track section 38 is arcuate in extent so as to align with the adjacent sections 36 and 40. The curved section 38, as shown in FIGURES 2 and 9 has its opposite sides provided with plates 103 comprising weather baffles for the tracks. The baffles are provided with generally radially extending grooves or troughs 104 therein which serve as drain means for the channels. Further, as shown in FIGURE 2, a sealing strip 105 is secured to the top channel member 32 and against the edge of the removable track section 38 to establish a watertight seal at this place.

Fastening means such as screws, bolts or the like as at 106 are employed extending through registered apertures 108 in the bulkheads or partitions between longitudinally adjacent compartments and apertures 110 in the removable sections. Thus, a section may be readily removed in order to disengage the sliding door of a particular compartment from its track system.

In this manner it is possible to replace or repair an individual sliding door without the necessity for removing other doors to obtain access thereto.

Since the doors are stored partially in a horizontal position in the track sections 40 and partially in the vertical track portions 82 in the space 30, it will be apparent that the vertical height of the sliding doors is no longer limited by either the vertical height or the horizontal width of the body.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A longitudinally extending compartmental truck body having a top, bottom and sides together with a pair of transversely adjacent and alined compartments, said compartments extending longitudinally of said body and having vertically and longitudinally extending back walls disposed in transversely spaced relation and terminating in downwardly spaced relation to said top and defining therebetween a single vertically and longitudinally extending chamber, said chamber opening into both of said compartments in the space immediately beneath said top, a pair of sliding doors each controlling access to one of said compartments through the associated side, a pair of U-shaped track means for each door in said body each of the pair having a pair of vertical portions disposed respectively in a side and in said chamber and a horizontal portion joining said pair of vertical portions and disposed entirely in one compartment in the space immediately beneath said top, each pair of track means guidingly engaging and supporting a door during vertical movement from a closed position on one of said sides, horizontal movement across the top of its associated compartment and vertical movement to a stored position in said chamber.

2. The combination of claim 1 wherein the lengths of said doors exceed the lengths of either vertical portion or of the horizontal portion of the associated track means.

3. The combination of claim 1 wherein the horizontal portions of said pair of track means are disposed in the same horizontally extending plane in spaced relation to each other.

4. The combination of claim 3, the lengths of said doors exceeding the lengths of each of said portions of the associated track means.

5. The combination of claim 1 including a pair of counterbalance means mounted upon said body and disposed over said chamber in said space immediately beneath said top, each counterbalance means being connected to one door and maintaining on the associated door a counterbalance force of sufficiently varied magnitude to obtain a substantially constant effective unbalanced weight of the door throughout its range of movement.

6. The combination of claim 5 wherein each counterbalance means comprises a spring winch and a cable wound upon said winch and connected to the associated door.

7. The combination of claim 6 including an inverted channel member secured to and projecting above and disposed medially and longitudinally of said top and opening downwardly therebeneath into said space immediately beneath said top, a transverse bracket secured in said channel member and projecting downwardly therebeneath, said spring winches being rotatably supported upon opposite sides of said bracket.

8. The combination of claim 7 wherein each spring winch comprises a drum having a cable receiving annular channel of substantially the same width as the diameter of the associated said cable.

9. The combination of claim 6 wherein each spring winch comprises a drum having a cable receiving annular channel of substantially the same width as the diameter of the associated said cable.

10. The combination of claim 1 wherein each door includes support rollers engaged in the corresponding track means, each track means including a track section readily removable and thereby affording passage of said door support rollers into and out of said track means.

11. The combination of claim 10 wherein the side edges of said door contiguous to the associated support rollers are cut-away providing recesses receiving said support rollers whereby both said support rollers and door side edges are received within said track means.

12. The combination of claim 1 wherein each door includes support rollers engaged in the corresponding track means, each track means including a track section readily removable and thereby affording passage of said door support rollers into and out of said track means, said track section being curvilinear and joining the vertical portion disposed upon a side with said horizontal portion.

13. The combination of claim 12 wherein said track section comprises a member having an arcuate channel whose ends are respectively alined with and form continuations of said last mentioned vertical and horizontal portions and further having an arcuate flange depending from the concave side of said member and detachably mounting said track section upon said body.

14. The combination of claim 1 including an inverted channel member secured to and projecting above and disposed medially and longitudinally of said top and opening downwardly therebeneath into said space immediately beneath said top, said track means being disposed in said body immediately beneath said channel member, weather-tight sealing members secured to a side wall of said channel member and projecting downwardly therefrom into an overlapping sealing engagement with said track means disposed adjacent thereto.

15. The combination of claim 1 including a pair of counterbalance means mounted upon said body and disposed over said chamber in said space immediately beneath said top, each counterbalance means being connected to one door and maintaining on the associated door a counterbalance force of sufficiently varied magnitude to obtain a substantially constant effective unbalanced weight of the door throughout its range of movement, each counterbalance means including a spring winch and a cable wound thereon and connected to the adjacent surface of the associated door at a location between the ends thereof, said cable lying in a line which is inclined to said door adjacent surface thereby avoiding rubbing and chafing of the cable upon the door.

References Cited in the file of this patent
UNITED STATES PATENTS

| | | |
|---|---|---|
| 517,122 | McGrath | Mar. 27, 1894 |
| 2,898,985 | Starr | Aug. 11, 1959 |
| 2,974,996 | Bitterman | Mar. 14, 1961 |
| 3,056,451 | Federline | Oct. 2, 1962 |